(12) United States Patent
Fukushima et al.

(10) Patent No.: US 8,396,098 B2
(45) Date of Patent: Mar. 12, 2013

(54) DIGITAL PROTECTIVE RELAY DEVICE AND DATA TRANSMISSION DEVICE FOR THE SAME

(75) Inventors: Kazuto Fukushima, Aoba-ku (JP); Hideaki Sugiura, Fuchu (JP); Masamichi Saga, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 336 days.

(21) Appl. No.: 12/933,281

(22) PCT Filed: Mar. 18, 2009

(86) PCT No.: PCT/JP2009/001225
§ 371 (c)(1),
(2), (4) Date: Sep. 17, 2010

(87) PCT Pub. No.: WO2009/116292
PCT Pub. Date: Sep. 24, 2009

(65) Prior Publication Data
US 2011/0013676 A1    Jan. 20, 2011

(30) Foreign Application Priority Data
Mar. 18, 2008 (JP) .................................. 2008-069731

(51) Int. Cl.
*H04B 3/36* (2006.01)
(52) U.S. Cl. ............................ 375/211; 361/80; 700/292
(58) Field of Classification Search .................. None
See application file for complete search history.

(56) References Cited

U.S. PATENT DOCUMENTS

| 3,984,737 | A | * | 10/1976 | Okamura et al. ............... 361/80 |
| 7,558,686 | B1 | * | 7/2009 | Morello .......................... 702/67 |
| 2009/0079436 | A1 | * | 3/2009 | Kojori et al. .................. 324/520 |

FOREIGN PATENT DOCUMENTS

| EP | 1 195 876 A2 | 4/2002 |
| GB | 2 072 974 A | 10/1981 |
| JP | 53 107642 | 9/1978 |
| JP | 60 46718 | 3/1985 |
| JP | 2000 152486 | 5/2000 |
| JP | 2004 260885 | 9/2004 |

OTHER PUBLICATIONS

Search Report issued Nov. 14, 2012 in European Patent Application No. 09722171.7.

* cited by examiner

*Primary Examiner* — Leon-Viet Nguyen
(74) *Attorney, Agent, or Firm* — Oblon, Spivak, McClelland, Maier & Neustadt, L.L.P.

(57) ABSTRACT

Provided is a high-precision and highly functional digital protective relay device and a data transmission device for a digital protective relay device, by enabling transmission of large amounts of system electrical quantity data. The data transmission device for a digital protective relay device, the transmission device comprising: an analog/digital conversion portion 6, which, after sampling a system electrical quantity signal acquired from an electric power system at m times the fundamental frequency f0 (m>12) thereof, performs conversion into n-bit digital data (n>12); a data processing portion 7, which converts m sampling data of n bits with frequency m·f0, obtained by the analog/digital conversion portion, into k sampling data with frequency k·f0 (k≦m) at or below the former frequency; and a transmitting portion 8, which transmits k sampling data obtained by the data processing portion to another protective relay device in a prescribed transmission format.

5 Claims, 11 Drawing Sheets

| Frame synchro | Current data | | | | Voltage data | | | | Other |
|---|---|---|---|---|---|---|---|---|---|
| 17 bits | 1 | 16 bits | 1 | 16 bits | 1 | 16 bits | 1 | 16 bits | 1 | ... |

| Frame synchro | Current data | | | | ON-OFF | | Other | | CRC |
|---|---|---|---|---|---|---|---|---|---|
| 13 bits | 1 | 12 bits | 1 | 12 bits | 1 | 12 bits | 1 | 12 bits | 1 | 11 bits |

DIGITAL PROTECTIVE RELAY DEVICE AND DATA TRANSMISSION DEVICE FOR THE SAME

TECHNICAL FIELD

This invention relates to a digital protective relay device which protects a power transmission line or other electric power system, and to a data transmission device for a digital protective relay device which transmits signals used in digital protection computation.

BACKGROUND ART

A protective relay device is installed for the purpose of maintaining stable operation of an electric power system, when a fault which has occurred in a busbar, transformer, power transmission line, or other electric power system equipment is detected, by detaching the fault equipment from the robust electric power system.

In a important electric power system equipment, often a current differential protective relay device with excellent protection performance is applied as a protective relay device.

A current differential protective relay device takes as inputs the currents flowing at both ends of an equipment to be protected and performs a differential operation to detect interior and exterior faults, and so when applied to protection of power transmission lines, synchronizes with both terminals of the power transmission line and transmits and receives an instantaneous current value data acquired by its own terminal and the other terminal and takes as inputs the instantaneous current value data of its own terminal and the transmitted instantaneous current value data of the other terminal, performs a differential operation, and detects operation. When a current differential protective relay device for a power transmission line is a digital device, a PCM (Pulse Code Modulation) transmission method is adopted as a method of transmission of an instantaneous current value data (see for example Non-patent document 1).

This PCM transmission method is a method in which an instantaneous current value data signal is sampled at a sampling frequency based on signals within the protective relay device, and after conversion into digital signals, the data signal is encoded and transmitted.

Because a system current is sampled at intervals of an electrical angle of 30°, the sampling frequency in conventional PCM transmission methods is set to 600 Hz in the case of a 50 Hz system, and to 720 Hz in the case of a 60 Hz system.

Further, in current differential protective relay devices, as means of synchronizing the data sampling times at individual terminals, means of measuring and correcting time differences of sampling timing between opposing devices is employed, so that fixed conditions on the transmitting side are required. Further, 54 kbits/second is stipulated as the transmission speed, and the amount of data which can be transmitted per sampling is stipulated to be 90 bits in the case of 50 Hz and 75 bits for a 60 Hz system.

Figure 11:
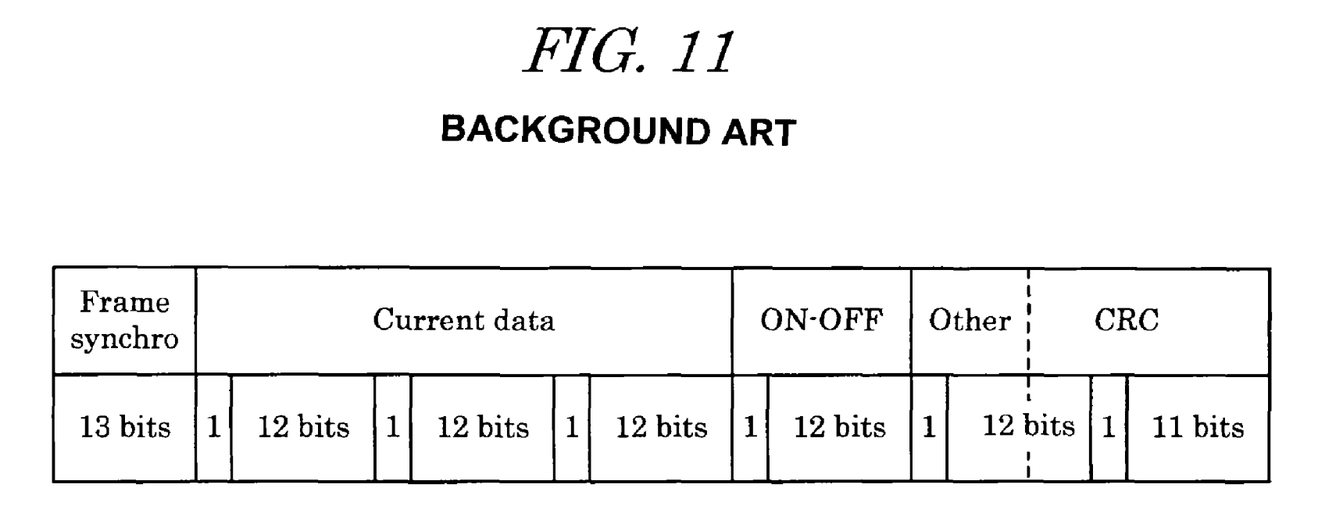
FIG. 11 is a view showing an example of the transmission format in a current differential protective relay device of the prior art.

FIG. 11 shows an example of a transmission format to transmit an instantaneous current value data signal, in a conventional PCM transmission method used in a 50 Hz system.

FIG. 11 shows an example of transmitting one sampling data of three-phase currents, using a frame with 90 bit length. In the frame, "1" bits inserted at 12-bit intervals are called fixed bits, and are used for frame identification.

Recently, sampling has come to be performed with the electrical angle changed from 30° to 3.75° and at the sampling frequency of 4800 Hz in the case of a 50 Hz system and 5760 Hz in the case of a 60 Hz system. Further, conversion into digital signals, conventionally has been performed using a resolution of 12 bits, but recently, conversion has come to be performed using a resolution of 16 bits. However, because the amount of data which can be transmitted is unchanged, it is necessary to take the trouble to convert 16-bit data into 12 bits and perform transmission (see for example Patent document 1).

Non-patent document 1: Toshiba Review, Vol. 41 No. 11, November 1986, pp. 942-945

Patent document 1: Japanese Patent Application Laid-open No. 2000-152486

As explained above, in conventional technology, even when sampling is performed with high precision and digitally converted data is acquired by a protective relay device, due to constraints on the communication system resulting from the sampling synchronization means, there has been the problem that a high-performance protective relay device capable of executing complex processing cannot be constructed.

DISCLOSURE OF THE INVENTION

This invention was devised in light of this problem with conventional technology, and has as an object the provision of a high-precision and highly functional digital protective relay device and a data transmission device for a digital protective relay device, by enabling transmission of large amounts of system electrical quantity data.

In order to attain the above object, a data transmission device for a digital protective relay device of this invention is characterized in comprising: an analog/digital conversion portion, which, after sampling a system electrical quantity signal acquired from an electric power system at m times the fundamental frequency f0 (m>12) thereof, performs conversion into n-bit digital data (n>12), and obtains m sampling data of n bits with frequency m·f0; a data processing portion, which converts m sampling data of n bits with frequency m·f0, obtained by the analog/digital conversion portion, into data with frequency k·f0 (k≦m) at or below the former frequency, and obtains k sampling data of n bits with frequency k·f0; and a transmitting portion, which transmits k sampling data obtained by the data processing portion to another protective relay device in a prescribed transmission format.

Further, a digital protective relay device of this invention is characterized in comprising: analog/digital conversion portions, respectively provided at opposing terminals of an electric power system, each of which, after sampling a system electrical quantity signal acquired at its own terminal at m times the fundamental frequency f0 (m>12) thereof, performs conversion into n-bit digital data (n>12), and obtains m sampling data of n bits with frequency m·0; a first data processing portion, which converts m sampling data of n bits with frequency m·f0, obtained by the analog/digital conversion portions, into data with a frequency k·f0 (k≦m) at or below the former frequency, and obtains k sampling data of n bits with frequency k·f0; a transmitting portion, which transmits k sampling data obtained by the first data processing portion to a protective relay device of the other terminal in a prescribed transmission format; a receiving portion, which receives k sampling data of the other terminal, transmitted as transmission data from the transmitting portion of the other terminal; a receiving processing portion, which converts k sampling data of the other terminal, received by the receiving portion, into data with frequency L·f0 (L≦k≦m) at or below the former frequency, and obtains L sampling data of n bits with frequency L·f0 of the other terminal; a second data processing portion, which converts k sampling data, obtained by the first data processing portion, into data with frequency L·f0 (L≦k≦m) at or below the former frequency, and obtains L sampling data of n bits with frequency L·f0 of its own terminal; and a computing processing portion, which uses L sampling data of the other terminal obtained by the receiving processing portion and L sampling data of its own terminal obtained by the second data processing portion, and performs a protection computation.

By means of this invention, an electrical quantity signal acquired from an electric power system is sampled at m times the fundamental frequency f0 (m>12) thereof, the sampled data is converted into m sampling data which are n-bit digital data (n>12), and the m sampling data of n bits with frequency m·f0 thus obtained are converted into k sampling data (k≦m) at frequency k·f0 equal to or lower than the former frequency, and are transmitted, so that large amounts of system electrical quantity data can be transmitted, and consequently a high-precision and highly functional digital protective relay device and data transmission device for a digital protective relay device can be provided.

EXPLANATION OF REFERENCE NUMERALS

| | |
|---|---|
| TE | Data transmission device |
| RyA | Digital protective relay device |
| 1 | Electrical power system |
| 2 | Circuit breaker |
| 3 | Power transmission line |
| 4 | Voltage transformer (VT) |
| 5 | Current transformer (CT) |
| 6 | Analog/digital conversion portion |
| 7, 7A, 7B | Data processing portion |
| 7-1 | Averaging portion |
| 7-2 | Sampling electrical quantity creation portion |
| 8 | Transmitting portion |
| 9 | Sampling signal generator |
| 10 | Receiving portion |
| 11, 11A | Receiving processing portion |
| 11-1 | Averaging portion |
| 12 | Second data processing portion |
| 13 | Computing processing portion |
| 13-1 | Fundamental wave calculation portion |
| 13-2 | Second harmonic calculation portion |
| 13-3 | Ratio judgment portion |
| 14 | Output portion |

BEST MODE FOR CARRYING OUT THE INVENTION

Below, embodiments of the invention are explained referring to the drawings. Portions common to drawings are assigned the same symbols, and redundant explanations are omitted.

First Embodiment

Figure 1:
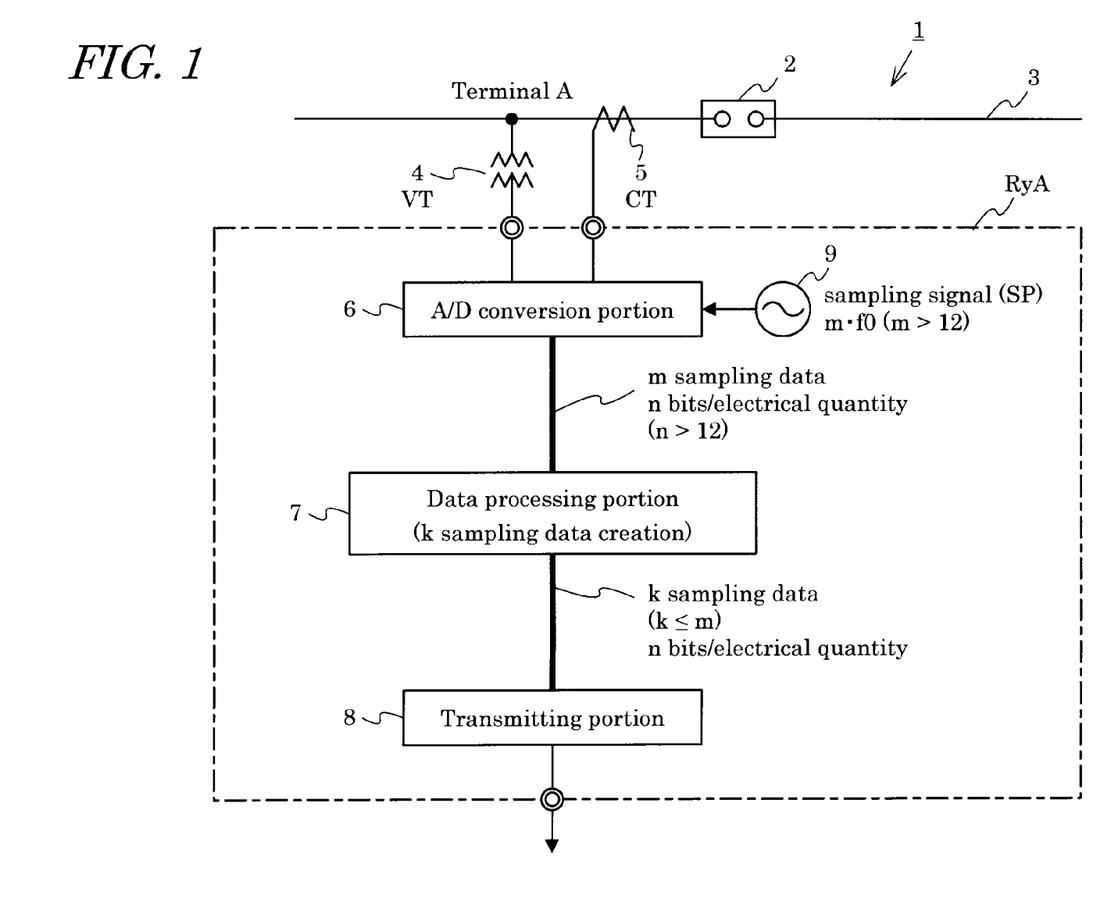
FIG. 1 is a system configuration diagram in a first embodiment of the invention.
Figure 2:
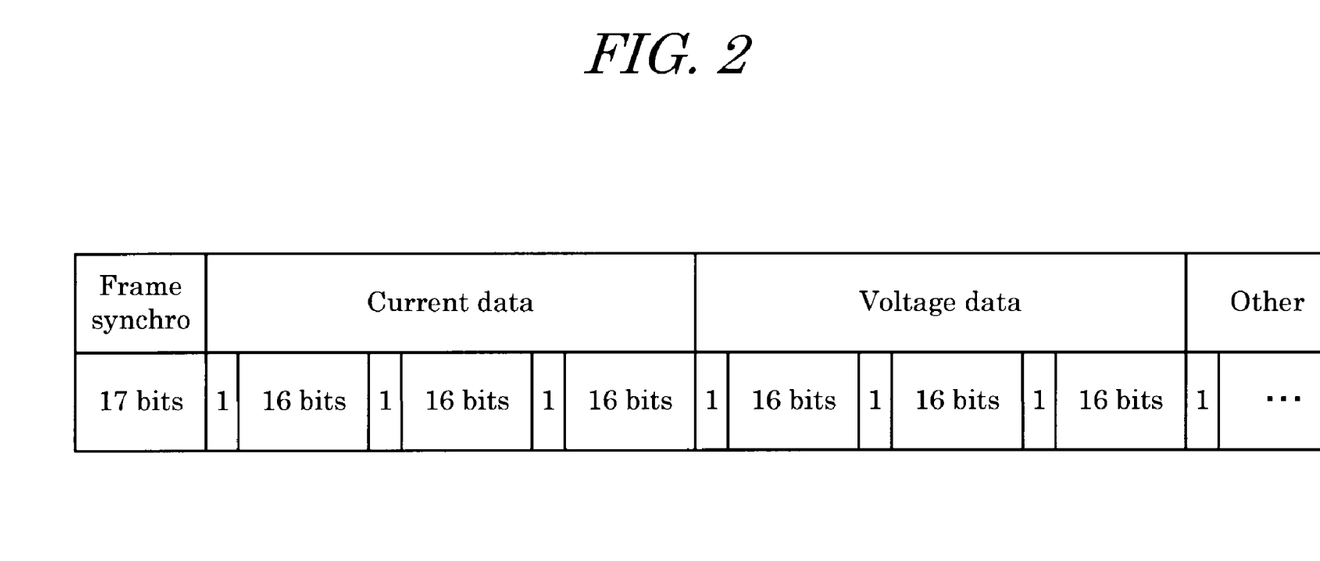
FIG. 2 is a view showing an example of a transmission format in first through fifth embodiments of the invention.

A first embodiment of the invention is explained, referring to FIG. 1 and FIG. 2.

(Configuration)

FIG. 1 is a system configuration diagram of the data transmission device for a digital protective relay device of this embodiment. The electric power system 1 connects a terminal A and an opposing terminal B, not shown, via a circuit breaker 2 and power transmission line 3. At each of the terminals (in FIG. 1, terminal A), a system voltage and system current (hereafter collectively called "system electrical quantities"), acquired by a voltage transformer (hereafter abbreviated "VT") 4 and current transformer (hereafter abbreviated "CT") 5, are input to a data transmission device TE, and are first converted into prescribed digital data by an analog/digital conversion portion (hereafter "A/D conversion portion") 6. The converted digital data is subjected to necessary processing by a data processing portion 7, and is transmitted via a transmitting portion 8 to another digital protective relay device of another side, not shown, installed at terminal B.

Here, among the constituent elements of the data transmission device TE, the A/D conversion portion 6 and transmitting portion 8 are configured as individual hardware resources; on the other hand, the data processing portion 7 realizes desired functions by using the hardware and software resources of a microprocessor mounted in the digital protective relay device.

The A/D conversion portion (A/D converter) 6 itself is well-known, and so here the internal configuration is not shown, but in general the A/D conversion portion (A/D converter) 6 is internally configured from the following elements, that is, an input converter, which converts an input system electrical quantity into a magnitude suitable for processing by an electronic circuit; an analog filter, which eliminates unwanted frequency components contained in the system electrical quantity; sample/hold means, which samples the signal output from the analog filter at fixed intervals, and holds a sampled value until analog/digital conversion ends; multiplexer means, which sequentially selects and outputs the output of the sample/hold means; and analog/digital conversion means, which converts the instantaneous value data of the system electrical quantity output from the multiplexer means, into digital data.

Among the internal constituent elements of such an A/D conversion portion (A/D converter) 6, the sample/hold means samples the system electrical quantity by means of a sampling signal with prescribed period output from a sampling signal generator 9 within the data transmission device TE, and after holding for a constant length of time, outputs the result. Further, the analog/digital conversion means performs analog/digital conversion of the sample/hold output while maintaining a prescribed relation with the sampling period.

In this embodiment, the sampling frequency of the sampling signal generator 9 within the data transmission device TE is set to m times the fundamental frequency f0 of the electric power system (m·f0), and moreover the factor m is set to a value exceeding 12 (m>12).

When the factor m is set to "32" (m=32), for example, in a system in which the fundamental frequency f0 is 50 Hz, the sampling frequency (m·f0) is m·f0=32·50=1600 Hz, and in a system in which the fundamental frequency f0 is 60 Hz, the sampling frequency (m·f0) is m·f0=32·60=1920 Hz. When the factor m is further raised and set to m=96, in a system in which the fundamental frequency f0 is 50 Hz, the sampling frequency (m·f0) is m·f0=96·50=4800 Hz, and in a system in which the fundamental frequency f0 is 60 Hz, the sampling frequency (m·f0) is m·f0=96·60=5760 Hz.

An instantaneous value data of a system electrical quantity sampled at this sampling frequency (m·f0) is converted into digital data of n bits (where n>12) per single electrical quantity (sampling) by the A/D conversion portion (A/D converter) 6, and is output as m sampling data of n bits/electrical quantity with sampling frequency (m·f0). Here, "12" is the number of bits used conventionally.

The data processing portion 7 is configured so as to perform data processing to convert the input m sampling data of n bits/electrical quantity with sampling frequency (m·f0) into data with a frequency (k·f0 (k≦m)) equal to or lower than this, and to send the result, as k sampling data of n bits/electrical quantity with frequency (k·f0), to the transmitting portion 8.

(Action)

Next, action of this embodiment is explained. In FIG. 1, system electrical quantities acquired by the VT 4 and CT 5 installed at terminal A of the electric power system 1 are input to the data transmission device TE, and are sampled, at a sampling frequency (m·f0) which is the fundamental frequency f0 multiplied by a factor m, by sample/hold means, not shown, within the A/D conversion portion 6.

Data sampled at this sampling frequency (m·f0) is converted into digital data of n bits (n>12) per single electrical quantity (sampling) by analog/digital conversion means within the A/D conversion portion 6, and output as m sampling data of n bits/electrical quantity with sampling frequency (m·f0), and is input to the data processing portion 7.

In the data processing portion 7, processing is performed to convert the input m sampling data of n bits/electrical quantity with sampling frequency (m·f0), into data with a frequency (k·f0 (k≦m)) equal to or lower than the former frequency, and the k sampling data of n bits/electrical quantity with frequency (k·f0) obtained as a result are output, and are transmitted, via the transmitting portion 8, to the other digital protective relay device of the other side, not shown, installed at terminal B.

FIG. 2 is a view showing an example of the transmission format for digital data of three phases of currents and voltages; here, a data format is shown for a case in which the n bits are 16 bits.

Conventionally, a single sampling data with an electrical angle of 30° was transmitted using 12 bits, but in the case of this embodiment, a single sampling data is transmitted using a longer bit length than 12 bits (in the example of FIG. 2, 16 bits), so that at the receiving device on the other side, waveform reproduction is more accurate than for the case of 12 bits. Further, by making the electrical angle a smaller value than 30°, such as for example 10° (in this case the sampling frequency is 1800 Hz, or three times as high as the conventional frequency), or 3.75° (in this case the sampling frequency is 4800 Hz, or eight times as high as the conventional frequency), more precise waveform can be reproduced.

(Advantageous Results)

As explained above, by means of this embodiment, electrical quantities acquired from an electric power system are sampled at m times the fundamental frequency f0 (m>12) thereof, the sampled data is converted into m sampling data which is n-bit (n>12) digital data, and the m sampling data of n bits with frequency m·f0 are converted into k sampling data with frequency k·f0 (k≦m) equal to or lower than the former frequency and are transmitted, so that large amounts of system electrical quantity data can be transmitted. As a result, more accurate waveform can be reproduced at the other-side receiving device, so that a data transmission device for a high-precision digital protective relay device can be provided.

Second Embodiment

Figure 3:
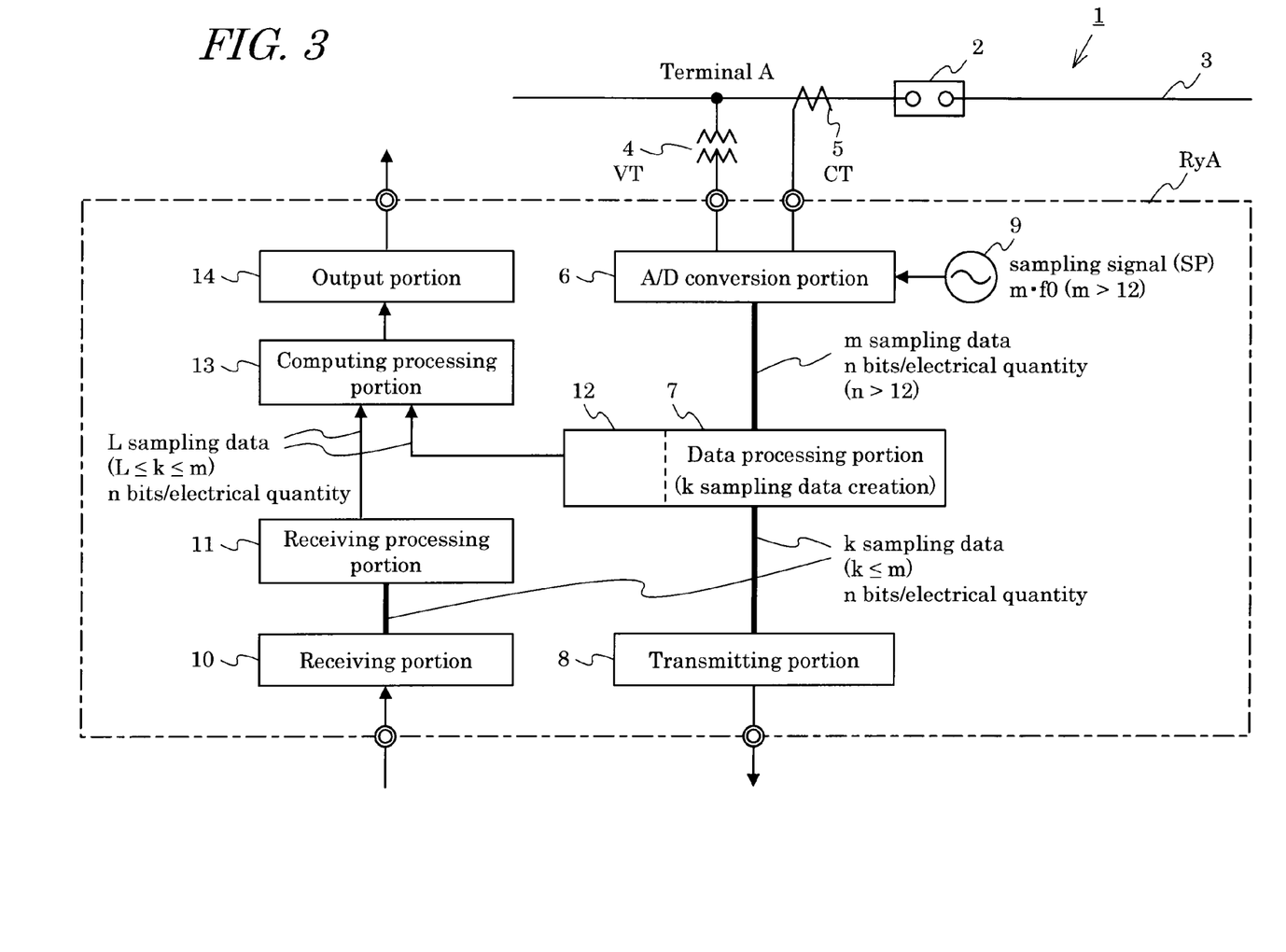
FIG. 3 is a system configuration diagram in the second embodiment of the invention.
Figure 4:
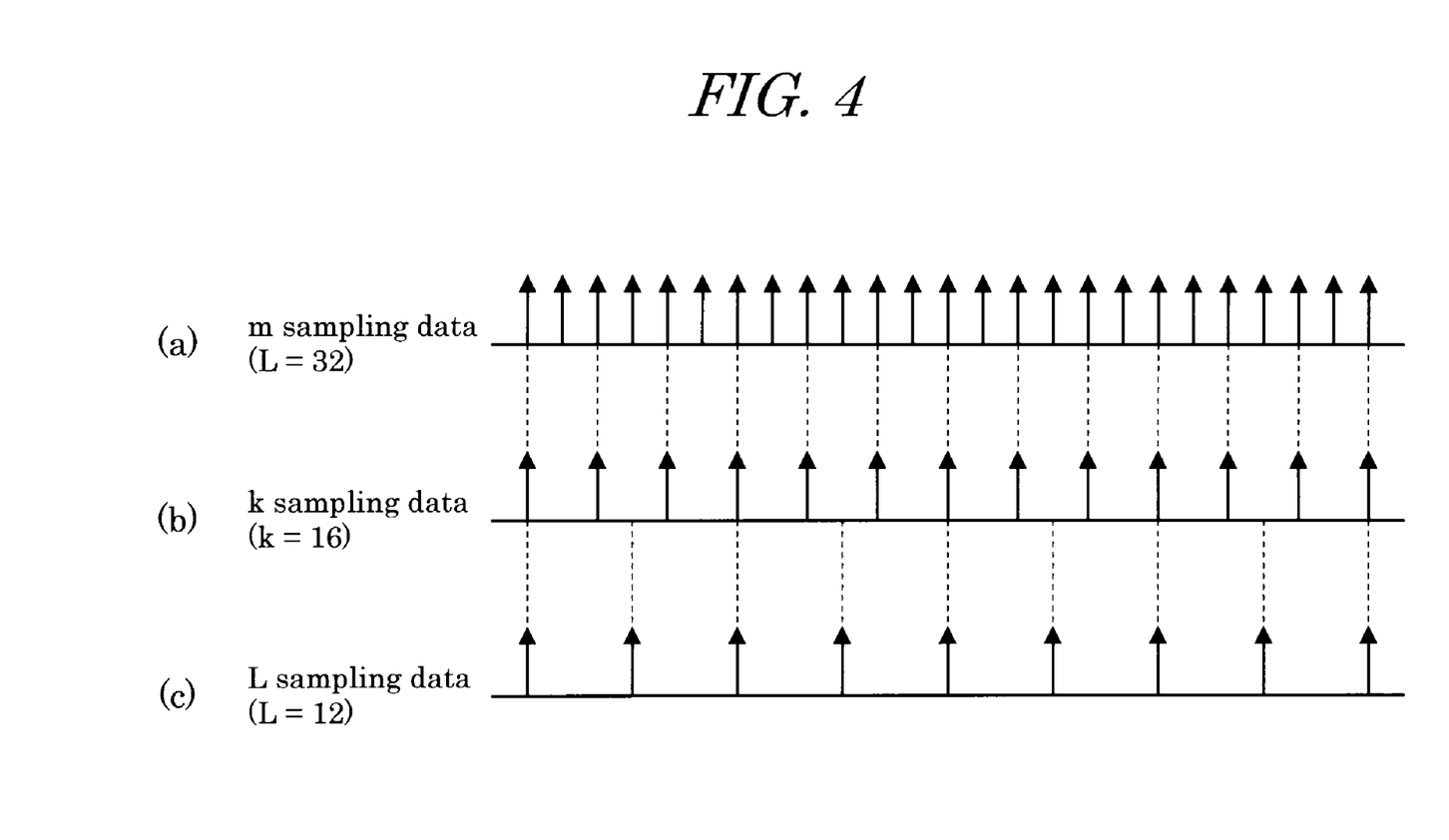
FIG. 4 is a view showing one example of data processing in the second embodiment of the invention.

A second embodiment of the invention is explained referring to FIG. 3 and FIG. 4.

(Configuration)

This embodiment relates to a current differential type digital protective relay device for power transmission line protection, to which the digital signal transmission device of the first embodiment is applied. This embodiment is explained taking a power transmission line protective relay device as an example; in addition, is also applicable to busbar protective relay devices, and is also applicable to a system stabilization device which collects instantaneous current value data from electric-supply stations distributed over a broad area, monitors system frequencies, and controls generators to stabilize the electric power system.

Below, the configuration of a digital protective relay device for power transmission line protection is explained, referring to FIG. 3.

The electric power system 1 connects a terminal A and an opposing terminal B, not shown, via a circuit breaker 2 and power transmission line 3. At the terminal A, system electrical quantities acquired by the VT 4 and CT 5 are input to the digital protective relay device RyA, and after passing through an input transformer and analog filter within the A/D conversion portion 6, sampling is performed by the sample/hold means at a sampling frequency (m·f0) which is m times the fundamental frequency f0. Instantaneous value data of the sampled system electrical quantities is converted into digital data of n bits (n>12) per electrical quantity (sampling) by the analog/digital conversion means within the A/D conversion portion 6, and is output as m sampling data of n bits with sampling frequency (m·f0) and input to the data processing portion 7.

And in the data processing portion 7, the input m sampling data of n bits with sampling frequency (m·f0) are converted into data with a frequency (k·f0 (k≦m)) equal to or lower than the former frequency, and the k sampling data of n bits with frequency (k·f0) obtained as a result are output. The transmitting portion 8 transmits to the other device the k sampling data of n bits with frequency (k·f0) obtained from the data processing portion 7.

Up to here, the configuration is the same as for the data transmission device TE of the first embodiment; but in this embodiment, a current differential type digital protective relay device RyA is realized by providing, in addition to the above configuration, a receiving portion 10, which receives k sampling data of n bits per electrical quantity, transmitted from the digital protective relay device, not shown, installed on the other side; a receiving processing portion 11, which performs processing to convert the received other-side k sampling data into data with a frequency (L·f0 (L≦k≦m)) equal to or lower than the former frequency, and outputs the result as L sampling data of n bits/electrical quantity with frequency (L·0); a data processing portion 12, which performs processing to convert the k sampling data created by its own data processing portion 7 into L sampling data and output the result; a computing processing portion 13, which takes as inputs the L sampling data of the other terminal output from the receiving processing portion 11 and the L sampling data of its own terminal output from the data processing portion 12, performs a differential computation, and, when the computation result is equal to or greater than a prescribed value, outputs a trip command; and, an output portion 14, which sends the trip command of this computing processing portion 13 to a trip circuit of its own circuit breaker 2.

Here, among the constituent elements of the digital protective relay device RyA, the A/D conversion portion 6, transmitting portion 8, receiving portion 10, and output portion 14 are configured using dedicated hardware resource, and the functions of the data processing portion 7, receiving processing portion 11, data processing portion 12, and computing processing portion are realized by using the hardware and software resources of a microprocessor.

The digital protective relay device RyA and the opposing other-side digital protective relay device, not shown, must have time-synchronized at both terminals when sampling system electrical quantities; here, a time synchronization method using the GPS (Global Positioning System), and a high-precision time synchronization method using SNTP (Simple Network Time Protocol) and similar, are already in use, and these technologies can be adopted in this embodiment as well.

In the above-described data processing portion 7, receiving processing portion 11 and second data processing portion 12, a method of stepwise thinning from m sampling data in a fixed period as shown in FIG. 4 is conceivable as one example of a method to convert from m sampling data to k sampling data, and further to L sampling data. In FIG. 4, stepwise thinning of m sampling data (a) when m is 32 to k sampling data (b) when k is 16, and further to L sampling data (c) when L is 12, is shown.

(Action)

Next, action of this embodiment is explained. In FIG. 3, a system electrical quantity signal acquired from the electric power system 1 by the VT 4 and CT 5 is sampled by the sample/hold means within the A/D conversion portion 6 at a sampling frequency (m·f0, where m>12) which is m times the fundamental frequency f0.

Data sampled at this sampling frequency (m·f0) is converted into digital data of n bits (n>12) per electrical quantity (sampling) by the analog/digital conversion means within the A/D conversion portion 6, output as m sampling data of n bits/electrical quantity with sampling frequency (m·f0), and input to the data processing portion 7.

In the data processing portion 7, processing is performed to convert the input m sampling data of n bits with sampling frequency (m·f0) into data with a frequency (k·f0 (k≦m)) equal to or lower than this, and the k sampling data of n bits/electrical quantity with frequency (k·f0) obtained as a result are output and are transmitted to the other side via the transmitting portion 8.

In the data processing portion 12, the k sampling data of n bits/electrical quantity with frequency (k·f0), created by the data processing portion 7, are converted into L sampling data with a frequency (L·f0 (L≦k≦m)) equal to or lower than this, which is convenient for protection computation, and the result is output to the computation means 13.

On the other hand, the receiving portion 10 sends signals transmitted from the other device, that is, the k sampling data of the other terminal, to the receiving processing portion 11. The receiving processing portion converts the k sampling data of the other terminal into L sampling data, and outputs the result to the computing processing portion 13.

The computing processing portion 13 inputs the L sampling data of instantaneous value data of system electrical quantities at the other terminal, output from the receiving processing portion 11, and the L sampling data of instantaneous value data of system electrical quantities at its own terminal, output from the data processing portion 12, and performs a differential computation; when the computation result is equal to or greater than a prescribed value, a trip command is output to the circuit breaker 2 via the output portion 14.

Figure 5:
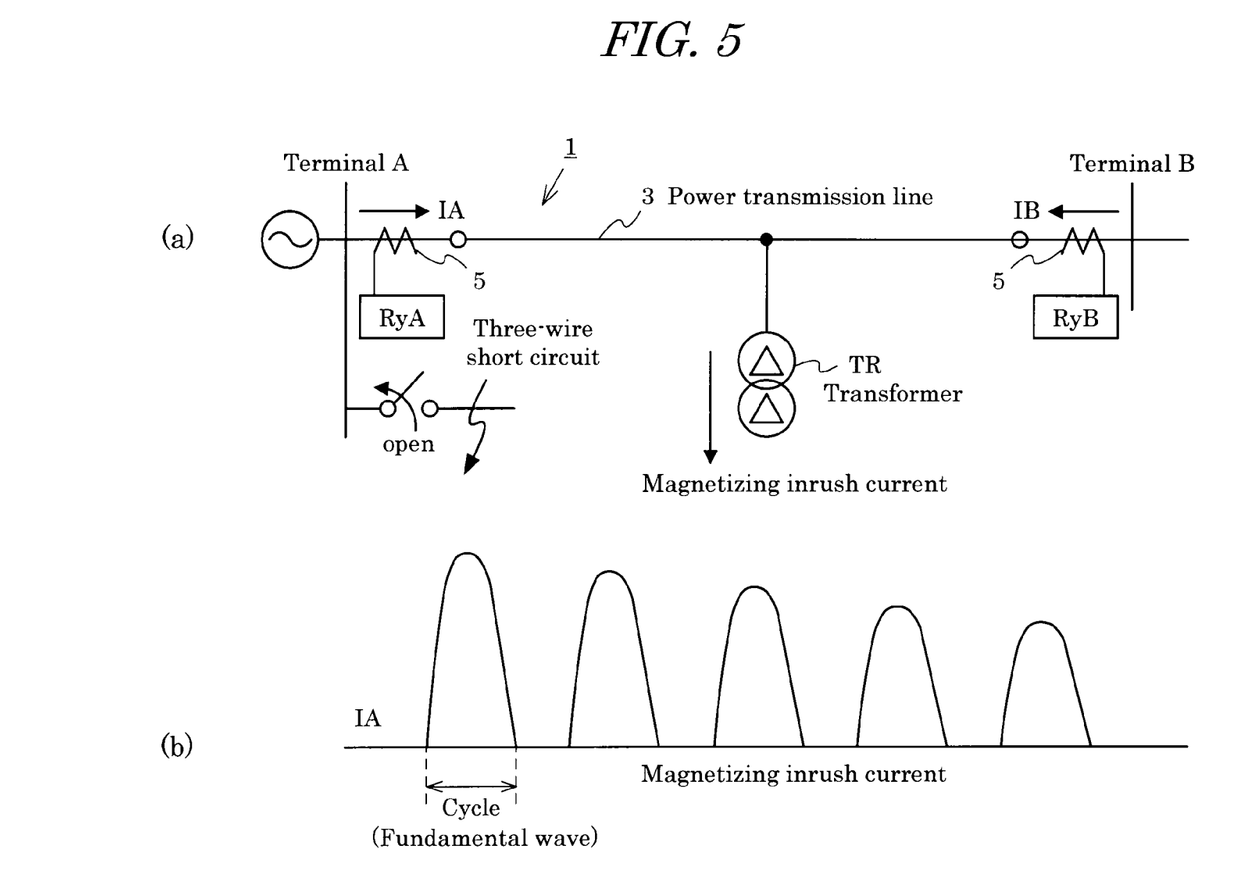
FIG. 5 is a view showing an example of generation of a magnetizing inrush current and a waveform example.
Figure 6:
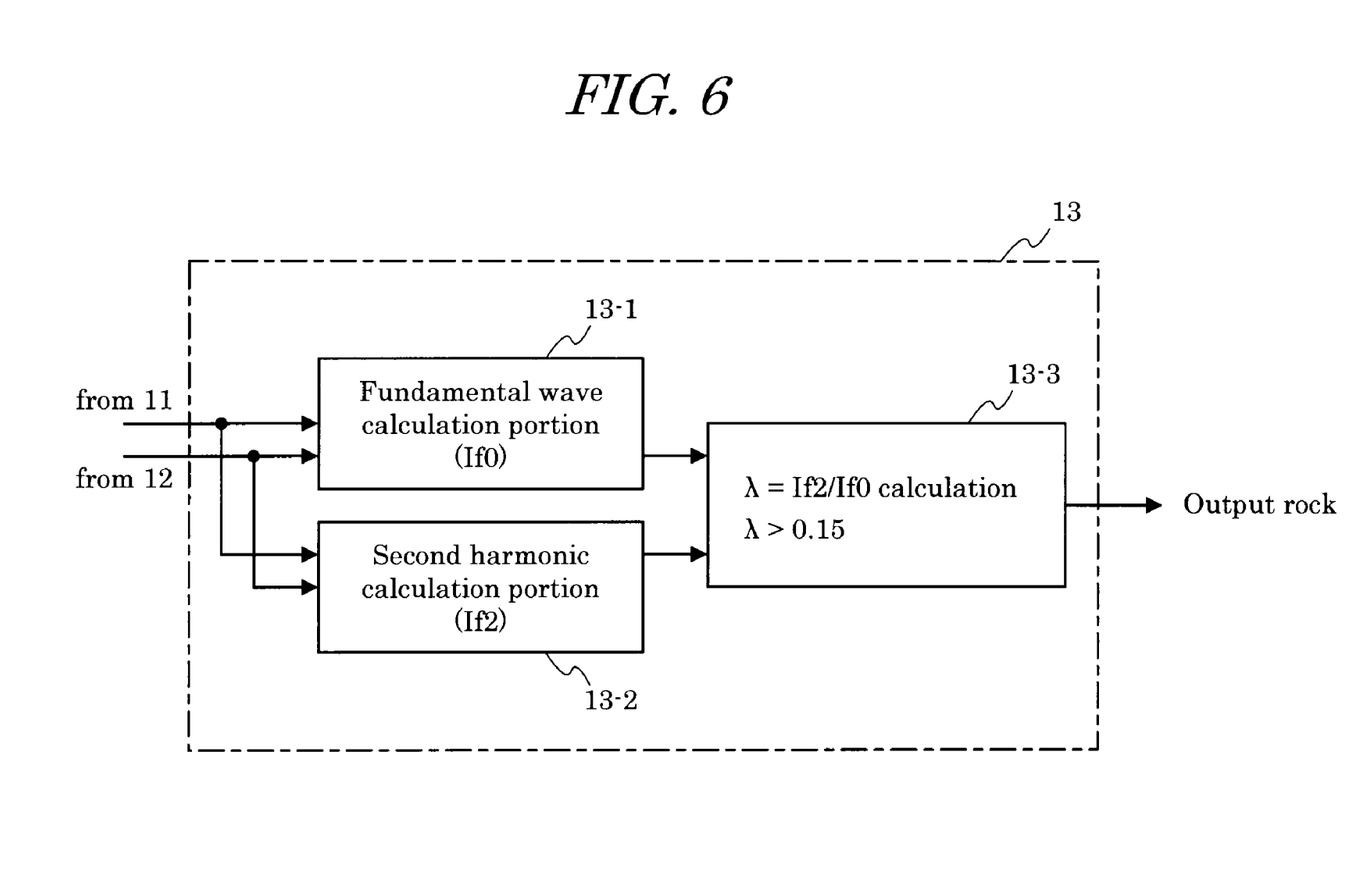
FIG. 6 is a view showing an example of a magnetizing inrush current block circuit.

FIG. 5 shows a current differential protection method for a power transmission line with a branch load, FIG. 5(a) is an electric power system configuration diagram, and FIG. 5(b) is a waveform diagram of a magnetizing inrush current, while FIG. 6 is a functional block diagram of the computing processing portion 13.

A transformer TR which is a branch load is connected midway on the power transmission line 3, and digital protective relay devices for power transmission line protection RyA, RyB are installed at both terminals (terminal A, terminal B). The digital protective relay devices RyA, RyB use the currents at terminal A and at terminal B respectively to judge whether there is a fault in the power transmission line 3. An example of this judgment method is described below.

If the currents at the two terminals are respectively IA and IB, then given that $$Id = IA + IB$$

$$Ir = |IA| + |IB|,$$

if Id−kIr>ko is established, a "fault" judgment is made, and a trip command is output to trip the circuit breaker 2.

Here, k and ko are constants. IA and IB are each obtained by transmitting and receiving of data converted into m-sampled, n bits/electrical quantity digital data. The current of the branch load TR is expressed constantly as a difference current, and the sensitivity ko of the current differential relay is decided taking this value into consideration.

In FIG. 5(a), if a three-phase short-circuit fault occurs at close range of the power supply terminal A, and the fault is eliminated by the protective relay of terminal A, then the voltage at terminal A returns from zero to the rated value. At this time, a magnetizing inrush current flows to the transformer TR which is a branch load of the power transmission line 3, as shown in FIG. 5(b), and a difference current occurs during differential computation of the digital protective relay devices RyA, RyB which are protecting the power transmission line 3, so that there is the concern that the digital protective relay devices RyA, RyB may operate incorrectly, and result in erroneous cutoff of the two terminals.

FIG. 6 is an example of a protection computation method in which, in order to lock the digital protective relay devices RyA, RyB at such times, in addition to a fundamental wave calculation portion (If0) 13-1 which detects the fundamental wave difference current, a second harmonic calculation portion (If2) 13-2 which detects the second harmonic contained in the magnetizing inrush current of the transformer, and a ratio judgment portion 13-3 which determines the content of the second harmonic relative to the fundamental wave (λ=If2/

If0) are provided, and when the content of the second harmonic relative to the fundamental wave is for example equal to or greater than 0.15 (15%), the operation outputs of the digital protective relay devices RyA, RyB are locked.

When using the digital protective relay devices RyA, RyB to detect the magnetizing inrush current of the transformer TR, it is difficult to accurately detect sampling data at the conventional 12 times the fundamental wave, and data at 24 times or higher is desired. Hence by performing processing such that, from k sampling data (k≧24) created at its own side, or from k sampling data (k≧24) received from the opposing terminal, 24× data is created, the content λ of the second harmonic is determined as shown in FIG. 6, and upon detecting that this is 15% or higher, the outputs of the digital protective relay devices RyA, RyB are locked, a digital protective relay device can be obtained which does not operate incorrectly when a magnetizing inrush current flows into a branch load transformer TR.

Figure 7:
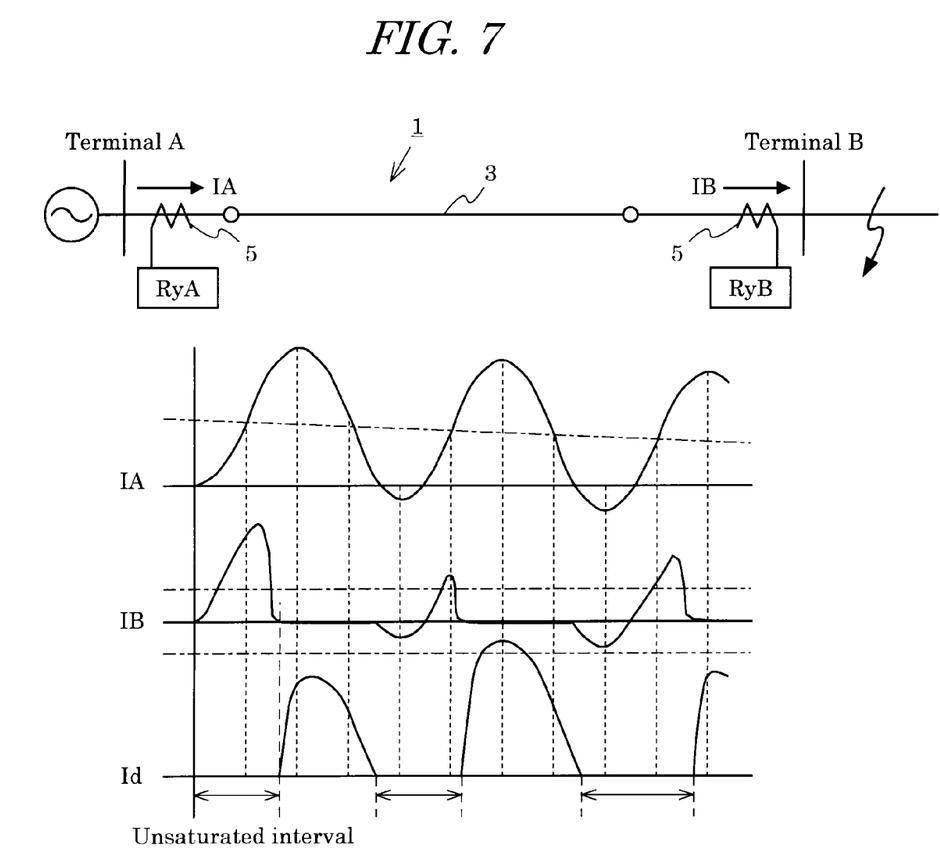
FIG. 7 is a view showing an example of CT saturation.

Further, even when an excessive current flows at the time of a fault external to the power transmission line 3 and CT saturation occurs, the digital protective relay devices RyA, RyB of this embodiment can operate normally. FIG. 7 is a view showing terminal currents and the differential current acquired at the time of an external fault.

In an external fault on the side of terminal B, when the CT 5 of terminal B reaches saturation, electrical quantities obtained via the CT 5 at the digital protective relay device RyB on the side of the terminal B show a waveform such as IB in FIG. 7.

At this time, the differential current (IA-IB) between the two terminals A, B are as shown by Id in FIG. 7, and there is always an "unsaturated interval" (unchanged); there is a method in which this unchanged portion is detected and the differential computation is locked.

In a protective relay device which is not subject to such constraints of the transmission system, of which busbar protective devices are representative, this method enables accurate reproduction of the Id waveform through digital data conversion with a high-precision sampling frequency and n bits, and enables reliable locking with high sensitivity and high quality.

In a current differential type digital protective relay device, there is a limit to the number of transmission bits due to transmission system constraints, and the above waveform reproduction has not been realized with high precision, but by means of this embodiment, high-precision reproduction can easily be achieved.

(Advantageous Results)

By means of this embodiment, by sampling acquired electrical quantities at m times the fundamental frequency f0 (m>12), converting the sampled data into m sampling data which are digital data of n bits (n>12), and converting the m sampling data of n bits with frequency m·f0 into k sampling data with frequency k·f0 (k≦m) equal to or lower than the former frequency and transmitting, large amounts of system electrical quantities can be transmitted. As a result, more accurate waveform can be reproduced on the side of the receiving device, and by using this data to obtain sampling data required for protection computation, previously unavailable measures can be taken to cope with magnetizing inrush currents of transformers and with erroneous operation due to CT saturation at times of external faults, and a high-quality digital protective relay device can be provided.

Third Embodiment

Figure 8:
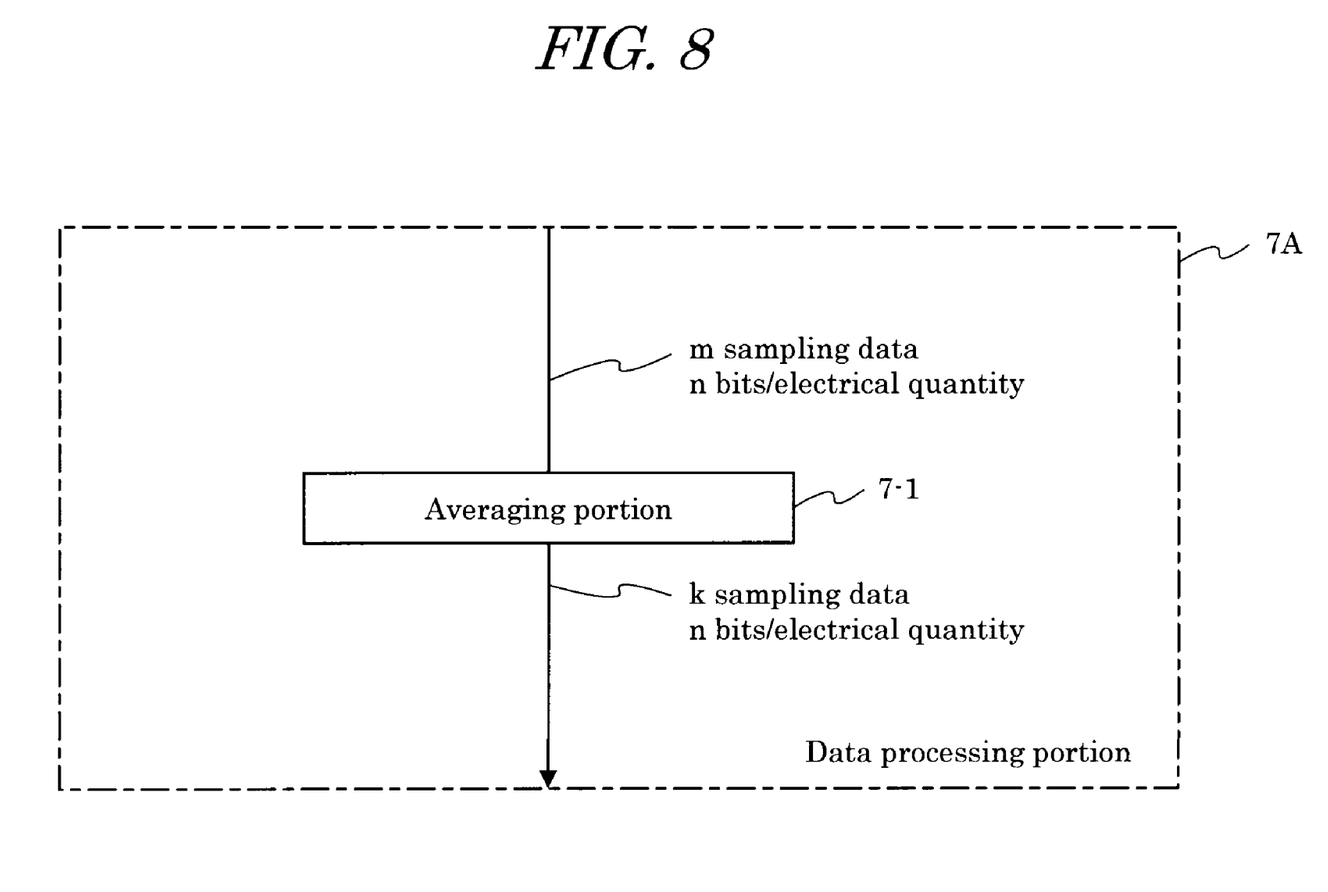
FIG. 8 is a system configuration diagram in the third embodiment of the invention.

A third embodiment of the invention is explained referring to FIG. 8.

(Configuration)

This embodiment is characterized in that the data processing portion 7 of the digital protective relay device RyA explained in the second embodiment is realized by an averaging portion 7-1 which performs processing to average data; otherwise the configuration is unchanged from that of the digital protective relay device RyA of the second embodiment, and so is omitted from the drawings.

The data processing portion 7A of this embodiment employs the averaging portion 7-1 to realize a method of converting the sampling data of FIG. 4(a) described above into the sampling data of FIG. 4(b). The averaging portion 7-1 performs averaging the input m sampling data of n bits/electrical quantity with sampling frequency of m·f0, and by this means performs conversion into and outputs k sampling data of n bits/electrical quantity with frequency k·f0 (k≦m).

In this embodiment, electrical quantities acquired by the VT 4 and the CT 5 from the electric power system 1, not shown, are sampled at m times the fundamental frequency (m>12) by the A/D conversion portion 6, and this sampled data is converted into sampling data of n bits (n>12).

And, in the data processing portion 7A, the input m sampling data are converted into k sampling data by averaging performed by the averaging portion 7-1 and are output, and are transmitted via the transmitting portion 8 to the other device; in addition, a differential computation is performed using instantaneous value data received from the other end and instantaneous value data created at its own side.

(Action)

Next, action of this embodiment is explained. Other than the data processing portion 7A, the configuration is the same as in FIG. 3, and so is only mentioned briefly, and the explanation centers on the data processing portion 7A.

In the averaging portion 7-1 of this embodiment, by taking the average of the past N sampling data, white noise superposed on N sampling data can be effectively compressed.

An example of averaging is shown below. This processing is an example in which eight sampling data are averaged.

$$V_a = \sum_{b=0}^{7} (V_{a-b}) \ldots \text{example of averaging}$$

$V_{a-b}$ ... sampling at time $(a - b)$ $V_a$ ... averaged data (Advantageous Results)

By means of this embodiment, data obtained by sampling electrical quantities acquired from the electric power system 1 by the VT 4 and the CT 5 at m times the fundamental frequency (m>12) in the A/D conversion portion 6 is converted into m sampling data which are n-bit digital data (n>12), and the m sampling data of n bits with frequency m·f0 obtained are subjected to averaging of the data processing portion 7A and converted into k sampling data with frequency k·f0 equal to or lower than the former frequency (k≦m) and transmitted, so that in addition to advantageous results similar to those of the second embodiment, white noise is further removed, and more accurate waveform can be reproduced on the side of the receiving device. By using this averaged data and obtaining sampling data necessary for protection computation, previously unavailable measures can be taken to cope with magnetizing inrush currents of transformers and with erroneous operation due to CT saturation at times of external faults, and a high-quality digital protective relay device can be provided.

Fourth Embodiment

Figure 9:
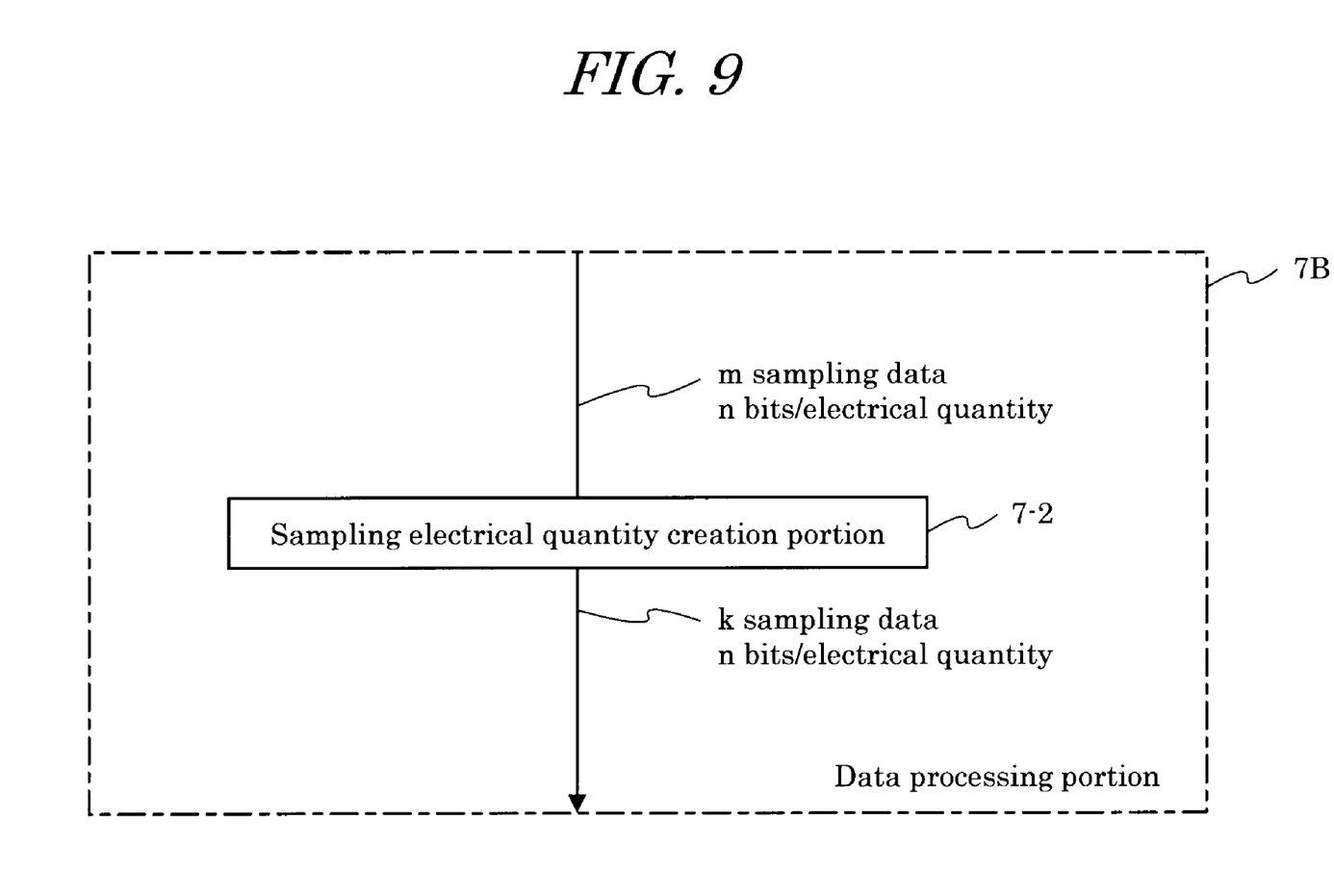
FIG. 9 is a system configuration diagram in the fourth embodiment of the invention.

Next, a fourth embodiment of the invention is explained referring to FIG. 9.
(Configuration)

This embodiment is characterized in that the data processing portion 7 of the digital protective relay device RyA explained in the second embodiment is realized by sampling electrical quantity creation portion 7-2, which performs processing to create sample electrical quantities; otherwise the configuration is unchanged from that of the digital protective relay device RyA of the second embodiment, and so is omitted from the drawings. The data processing portion 7B of this embodiment employs the sampling electrical quantity creation portion 7-2 to realize a method of converting sampling data of FIG. 4(*a*) described above into sampling data of FIG. 4(*b*). The sampling electrical quantity creation portion 7-2 samples m sampling data of n bits/electrical quantity with sampling frequency m·f0, to perform conversion into k sampling data of n bits/electrical quantity with frequency k·f0 (k≦m), which are output.

In this embodiment also, electrical quantities acquired from the electric power system 1, not shown, by the VT 4 and the CT 5 are sampled at m times the fundamental frequency (m>12) by the A/D conversion portion 6, and the sampled data is converted into n-bit (n>12) digital data.

And in the data processing portion 7B, the input m sampling data are subjected to sampling by the sampling electrical quantity creation portion 7-2 and converted into k sampling data which are output, and are transmitted via the transmitting portion 8 to the other device; in addition, a differential computation is performed using instantaneous value data received from the other end and instantaneous value data created at its own side.
(Action)

Next, action of this embodiment is explained.

Other than the data processing portion 7B, the configuration is the same as in FIG. 3, and so is only mentioned briefly, and the explanation centers on the data processing portion 7B.

In the sampling electrical quantity creation portion 7-2 of this embodiment, mode conversion is performed taking, for example, as symmetrical electrical quantities, a positive phase, reverse phase and zero phase, or α, β, zero of an αβ0 circuit, or similar.

Below, an example of a positive phase electrical quantity is described as an example of sampling electrical quantity processing.

$$3I_1 = Ia + \alpha Ib + \alpha^2 Ic$$

$$3V_1 = Va + \alpha Vb + \alpha^2 Vc$$

I$_1$: positive phase current
V$_1$: positive phase voltage
(Advantageous Results)

By means of this embodiment, data obtained by sampling electrical quantities acquired from the electric power system 1 by the VT 4 and the CT 5 at m times the fundamental frequency (m>12) in the A/D conversion portion 6 is converted into m sampling data which are n-bit digital data (n>12), and the m sampling data of n bits with frequency m·f0 obtained are subjected to sampling electrical quantity processing of the data processing portion 7B and converted into k sampling data with frequency k·f0 equal to or lower than the former frequency (k≦m) and transmitted, so that more accurate waveform can be reproduced on the side of the receiving device, and by using this data and obtaining sampling data necessary for protection computation, a high-quality digital protective relay device can be provided, which can be used in stability judgment.

Fifth Embodiment

Figure 10:
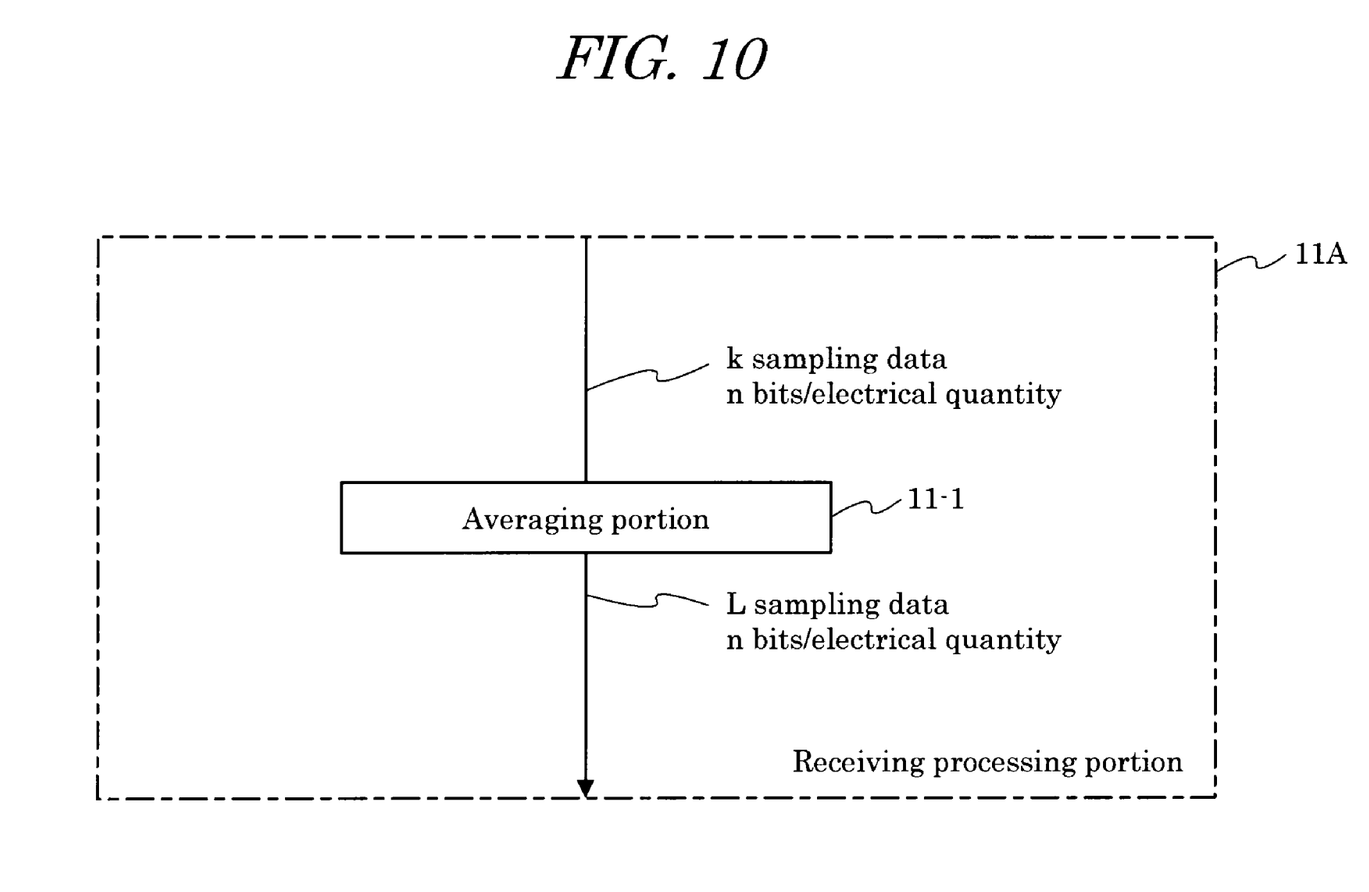
FIG. 10 is a system configuration diagram in the fifth embodiment of the invention.

Next, a fifth embodiment of the invention is explained referring to FIG. 10.

This embodiment is characterized in that the averaging method explained in the third embodiment is adopted in the receiving processing portion 11 in FIG. 3 of the second embodiment; other means are unchanged from those of the digital protective relay device RyA of the second embodiment, and so are omitted from the drawings.

The receiving processing portion 11A of this embodiment is realized by an averaging portion 11-1, which performs a method of converting the sampling data of FIG. 4(*b*) described above into the sampling data of FIG. 4(*c*); in the receiving processing portion 11A, the averaging portion 11-1 performs averaging of k sampling data of n bits per electrical quantity transmitted from the other device and received by the receiving portion 10, to perform conversion into L sampling data of n bits/electrical quantity, which are output.

By means of this averaging method, similarly to the averaging means 7-1 provided in the data processing portion 7A in FIG. 8 of the third embodiment, by taking the average of the past N sampling data, white noise superposed on N sampling data can be effectively compressed.

As stated above, by means of this embodiment, by performing averaging on the receiving side, white noise on the receiving side can also be eliminated, and by use in combination with the third embodiment, a still higher-quality digital protective relay device can be provided.

The invention claimed is:

1. A data transmission device for a digital protective relay device, comprising:
    an analog/digital conversion portion, which, after sampling a system electrical quantity signal acquired from an electric power system at m times the fundamental frequency f0 (m>12) thereof, performs conversion into n-bit digital data (n>12), and obtains m sampling data of n bits with frequency m·0;
    a data processing portion, which converts m sampling data of n bits with frequency m·f0, obtained by the analog/digital conversion portion, into data with frequency k·f0 (k≦m) at or below the former frequency, and obtains k sampling data of n bits with frequency k·0; and
    a transmitting portion, which transmits k sampling data obtained by the data processing portion to another protective relay device in a prescribed transmission format.

2. A digital protective relay device comprising:
    analog/digital conversion portions, respectively provided at opposing terminals of an electric power system, each of which, after sampling a system electrical quantity signal acquired at its own terminal at m times the fundamental frequency f0 (m>12) thereof, performs conversion into n-bit digital data (n>12), and obtains m sampling data of n bits with frequency m·f0;
    a first data processing portion, which converts m sampling data of n bits with frequency m·f0, obtained by the analog/digital conversion portions, into data with a frequency k·f0 (k≦m) at or below the former frequency, and obtains k sampling data of n bits with frequency k·0;

a transmitting portion, which transmits k sampling data obtained by the first data processing portion to a protective relay device of the other terminal in a prescribed transmission format;

a receiving portion, which receives k sampling data of the other terminal, transmitted as transmission data from the transmitting portion of the other terminal;

a receiving processing portion, which converts k sampling data of the other terminal, received by the receiving portion, into data with frequency $L \cdot f0$ ($L \leq k \leq m$) at or below the former frequency, and obtains L sampling data of n bits with frequency $L \cdot 0$ of the other terminal;

a second data processing portion, which converts k sampling data, obtained by the first data processing portion, into data with frequency $L \cdot f0$ ($L \leq k \leq m$) at or below the former frequency, and obtains L sampling data of n bits with frequency $L \cdot f0$ of its own terminal; and a computing processing portion, which uses L sampling data of the other terminal obtained by the receiving processing portion and L sampling data of its own terminal obtained by the second data processing portion, and performs a protection computation.

3. The digital protective relay device according to claim 2, wherein:

the first data processing portion, using an averaging method, converts m sampling data obtained by the analog/digital conversion portions, into k sampling data.

4. The digital protective relay device according to claim 2, wherein:

the first data processing portion, using a sampling method, converts m sampling data obtained by the analog/digital conversion portions, into sampled electrical quantity data, which are k sampling data.

5. The digital protective relay device according to claim 2, wherein:

The receiving processing portion, using an averaging method, converts k sampling data of the other terminal, received by the receiving portion, into L sampling data.

\* \* \* \* \*